US008864438B1

(12) United States Patent
Lee et al.

(10) Patent No.: US 8,864,438 B1
(45) Date of Patent: Oct. 21, 2014

(54) FLOW CONTROL INSERT IN COOLING PASSAGE FOR TURBINE VANE

(71) Applicants: Ching-Pang Lee, Cincinnati, OH (US); Gilles Carrier, Charlotte, NC (US)

(72) Inventors: Ching-Pang Lee, Cincinnati, OH (US); Gilles Carrier, Charlotte, NC (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 14/097,319

(22) Filed: Dec. 5, 2013

(51) Int. Cl.

| | |
|---|---|
| ***F01D 9/02*** | (2006.01) |
| ***F01D 5/08*** | (2006.01) |
| ***B23P 15/04*** | (2006.01) |
| ***F01D 5/18*** | (2006.01) |

(52) U.S. Cl.
CPC ................. *F01D 5/188* (2013.01); *B23P 15/04* (2013.01)
USPC ............. 415/1; 415/115; 416/96 A; 416/97 R

(58) Field of Classification Search
CPC .......... F05D 2260/20; F05D 2260/204; F05D 2260/2212
USPC .......... 415/115, 116, 1; 416/96 A, 96 R, 97 R
See application file for complete search history.

(56) References Cited

U.S. PATENT DOCUMENTS

| | | | | |
|---|---|---|---|---|
| 2,843,354 | A * | 7/1958 | Smith | 416/92 |
| 5,002,460 | A * | 3/1991 | Lee et al. | 416/96 A |
| 5,383,985 | A * | 1/1995 | Coulon | 148/527 |
| 5,669,759 | A * | 9/1997 | Beabout | 416/97 R |
| 5,704,763 | A * | 1/1998 | Lee | 416/96 R |
| 5,993,156 | A * | 11/1999 | Bailly et al. | 416/96 A |
| 6,874,988 | B2 * | 4/2005 | Tiemann | 415/115 |
| 2010/0054915 | A1 * | 3/2010 | Devore et al. | 415/116 |
| 2013/0028727 | A1 * | 1/2013 | Shinoda et al. | 415/208.1 |

FOREIGN PATENT DOCUMENTS

| | | | | |
|---|---|---|---|---|
| EP | 2025868 | A1 * | 2/2009 | F01D 5/18 |
| GB | 728834 | A * | 4/1955 | |

* cited by examiner

*Primary Examiner* — Edward Look
*Assistant Examiner* — Christopher R Legendre

(57) ABSTRACT

A flow control insert for a turbine vane is disclosed. The flow control insert is designed to be placed in a trailing edge cooling passage of the turbine vane to simultaneously reduce cooling air flow and increase heat transfer from the vane to the cooling air, thereby improving efficiency of the turbine via reduced cooling air flow requirement while maintaining vane temperature within a specified range. Two different flow control insert designs are disclosed, where either design fits inside the cooling passage opening and allows an existing vane casting design to be used.

11 Claims, 10 Drawing Sheets

FLOW CONTROL INSERT IN COOLING PASSAGE FOR TURBINE VANE

BACKGROUND OF THE INVENTION

1. Field of the Invention

This invention relates generally to cooling of vanes in a combustion gas turbine and, more particularly, to a flow control insert which can be placed in a cooling passage of a turbine vane to simultaneously reduce cooling air flow and increase heat transfer from the vane to the cooling air, thereby improving efficiency of the turbine via reduced cooling air flow requirement while maintaining vane temperature within a specified range.

2. Description of the Related Art

Combustion gas turbines are clean-burning, efficient devices for generating power for a variety of applications. One common application of combustion gas turbines is in power plants, where the turbine drives a generator which produces electricity. Such stationary gas turbines have been developed over the years to improve reliability and efficiency, but the continuous improvement quest never ends.

Turbines operate at very high temperatures and pressures, and cooling of internal components is required in order to prevent damage. However, pumping of large volumes of cooling air consumes a significant amount of energy, thus representing a parasitic loss of efficiency for the whole engine. It is therefore desirable to reduce the cooling air flow requirement of a turbine, although component temperatures must be maintained within an acceptable range as determined by material thermal limits and desired component life.

Turbine vanes are stationary airfoils which are arranged in circumferential rows inside the turbine, where rows of vanes are alternately positioned between rows of turbine blades. Because the vanes are directly exposed to the combustion gas, they get extremely hot and are therefore designed with internal cooling air passages to maintain temperature within specification. In addition, turbine vanes are often coated with a thermal barrier coating, such as a ceramic material with extremely high temperature capability.

The design and tooling of a turbine and all of its components is very expensive. Therefore, fully validated and time-tested components such as vanes are not frequently re-designed. However, even with existing vane designs, it is possible and desirable to improve turbine efficiency via reducing cooling air flow requirements, where the reduced volume of cooling air flow still maintains the vane within a specified temperature range.

SUMMARY OF THE INVENTION

In accordance with the teachings of the present invention, a flow control insert for a turbine vane is disclosed. The flow control insert is designed to be placed in a cooling passage of the turbine vane to simultaneously reduce cooling air flow and increase heat transfer from the vane to the cooling air, thereby improving efficiency of the turbine via reduced cooling air flow requirement while maintaining vane temperature within a specified range. Two different flow control insert designs are disclosed, where either design fits inside the cooling passage opening and allows an existing vane casting design to be used.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a flow control insert in a cooling passage of a turbine vane is merely exemplary in nature, and is in no way intended to limit the invention or its applications or uses.

Figure 1:
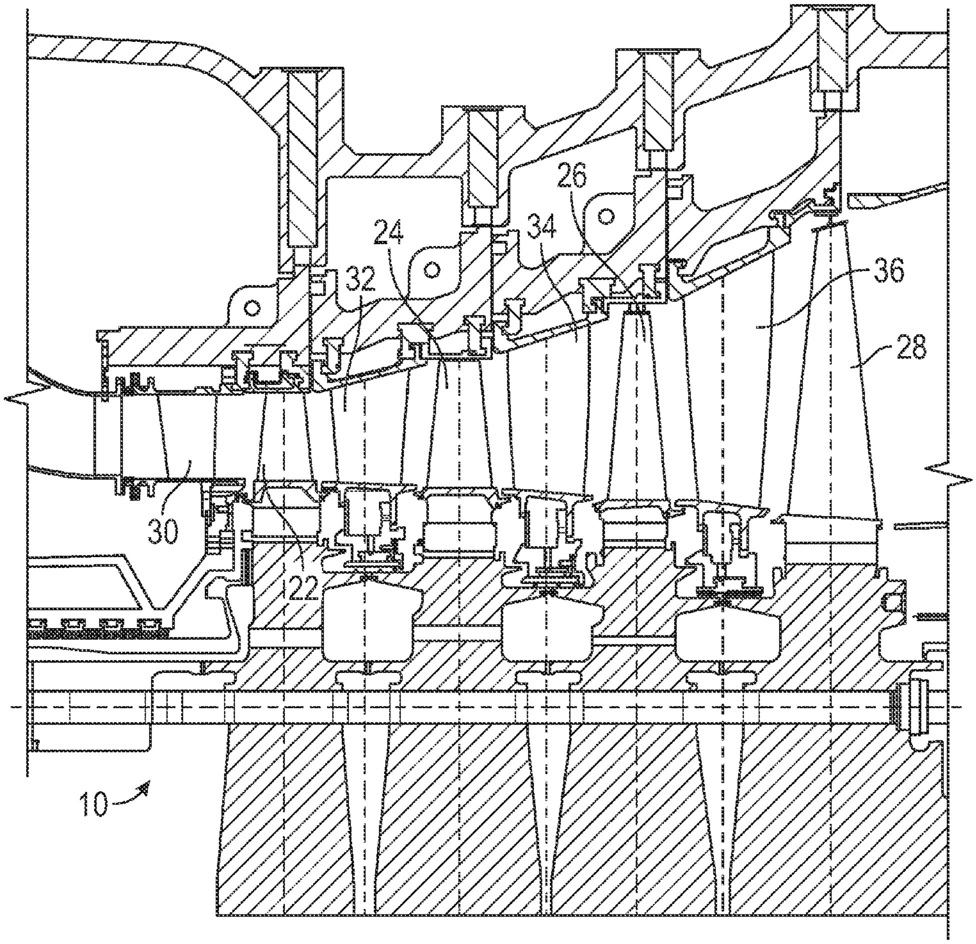
FIG. 1 (Prior Art)
FIG. 1 is a cross-sectional diagram of the turbine end of a combustion gas turbine showing a typical arrangement of blades and vanes.

FIG. 1 is a cross-sectional diagram of a combustion gas turbine 10, such as the type which is used to drive an electrical generator in a power plant. As is understood by anyone familiar with turbine machinery, the turbine 10 includes a series of blades (22, 24, 26, 28) and vanes (30, 32, 34, 36). The blades 22-28 are attached to a rotating hub and power shaft, where the power shaft drives downstream machinery such as a generator. The vanes 30-36 are fixed in place, being attached to inner and outer casings. The vanes 30-36 are airfoils which serve to direct and accelerate the flow of combustion gas as it expands, turns the blades 22-28 and passes through the turbine 10. As can be seen in FIG. 1, the blades 22-28 and the vanes 30-36 are arranged in alternating rows along the length of the turbine 10.

Modern combustion gas turbines such as the turbine 10 operate at very high temperatures for both efficiency and power density reasons. Even with advances in material technology, it is necessary to cool the components in the interior of the turbine 10 in order to prevent melting or damage due to over-temperature.

Figure 2:
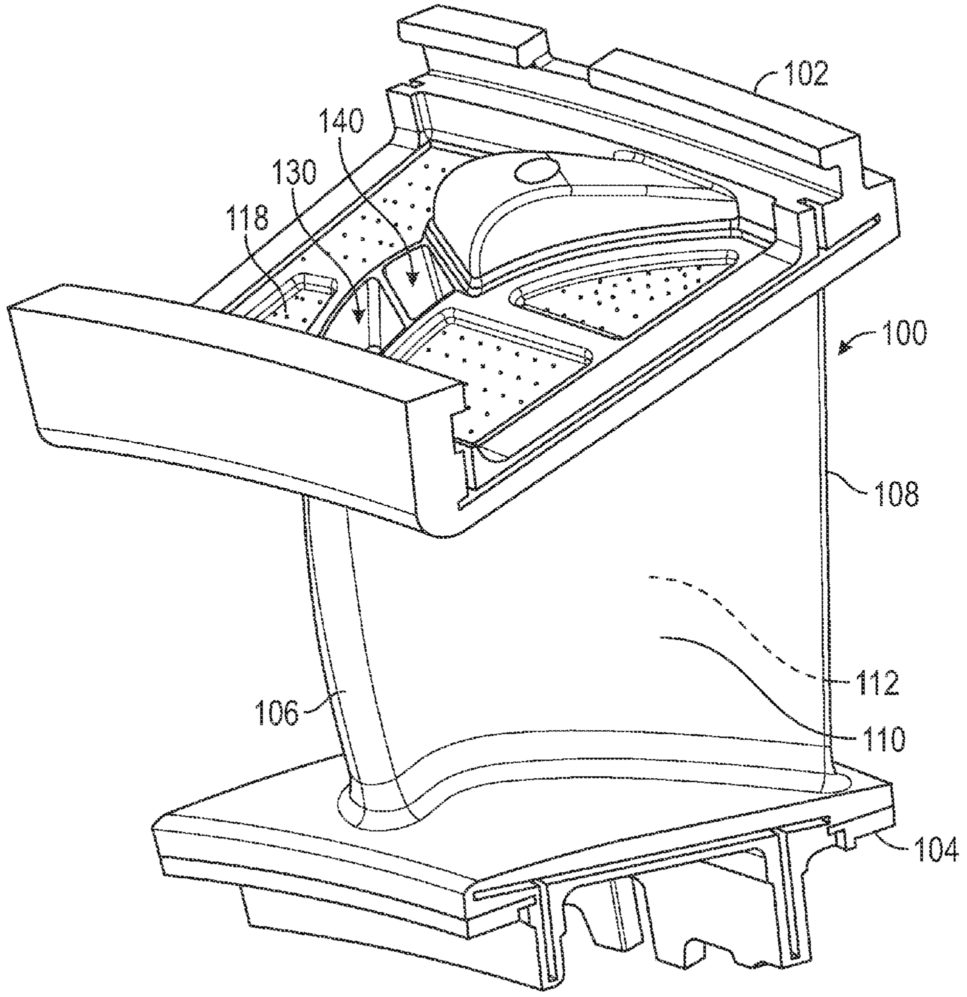
FIG. 2 is a perspective view of a turbine vane showing various features of the vane and how cooling air is introduced to the vane.

FIG. 2 is a perspective view of a turbine vane 100 showing various vane features and how cooling air is introduced to the vane 100. An outer shroud 102 attaches the vane 100 to the outer casing, discussed above. An inner shroud 104 attaches the vane 100 to an inner casing. Thus, the outer shroud 102 and the inner shroud 104 provide the structural connections to fix the vane 100 in place within the turbine 10. A leading edge 106 is oriented into the oncoming flow of expanding combustion gas, while a trailing edge 108 forms the opposite end of the vane's airfoil shape. A pressure side 110 is concave facing somewhat into the oncoming flow of combustion gas, while a suction side 112 (the "back" surface of the vane as shown in FIG. 2) is convex in shape and experiences a lower pressure.

An impingement plate 118 (the pinhole-perforated surface; shown again in FIG. 3) covers most of the top surface of the outer shroud 102, and allows some cooling air to penetrate and cool the upper portion of the vane 100. A leading edge cooling passage inlet 130 allows cooling air to enter a leading edge cooling passage, shown later in FIG. 4. A trailing edge cooling passage inlet 140 allows cooling air to enter a trailing edge cooling passage, also shown later in FIG. 4. With the exception of the impingement plate 118, the entirety of the vane 100 discussed above is typically constructed of a single-piece machined casting.

Figure 3:
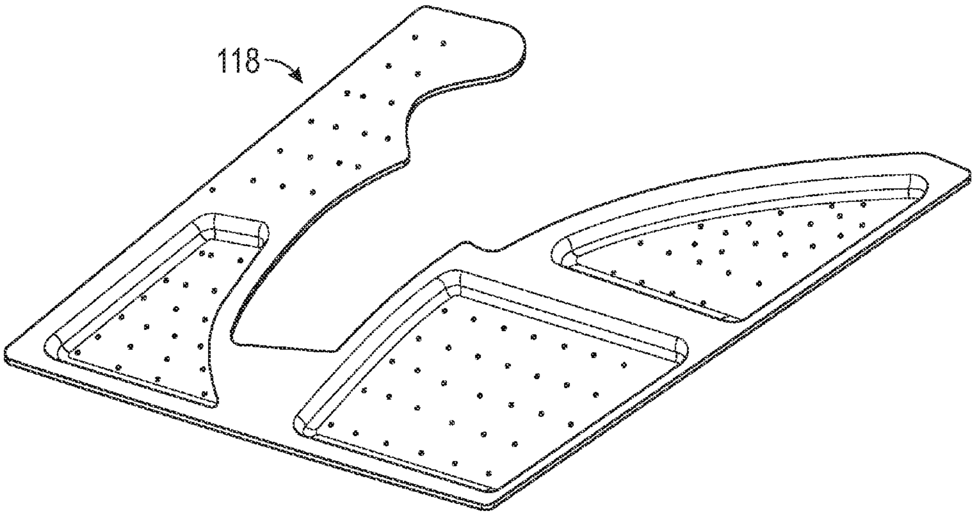
FIG. 3 is an illustration of an impingement plate, which is an element which is fitted to the outer end of the vane and allows some air to pass through to the vane's top surface.

FIG. 3 is an illustration of the impingement plate 118 by itself. FIG. 3 serves to clarify the shape of the impingement plate 118, which is fitted to the top surface of the upper shroud 102. As discussed above, the impingement plate 118 is affixed to the top of the vane 100, and the small holes in the impingement plate 118 allow some cooling air to pass through and cool the upper portion of the vane 100.

Because the critical components of the turbine 10 are highly engineered products, there is a reluctance to change the designs of these components once the extensive development and validation cycles have been completed. This reluctance to change a component design certainly applies to the machined casting which comprises the vane 100. However, the impingement plate 118 is a separate piece which is relatively inexpensive, and for which the tooling is relatively easy to change.

Figure 4:
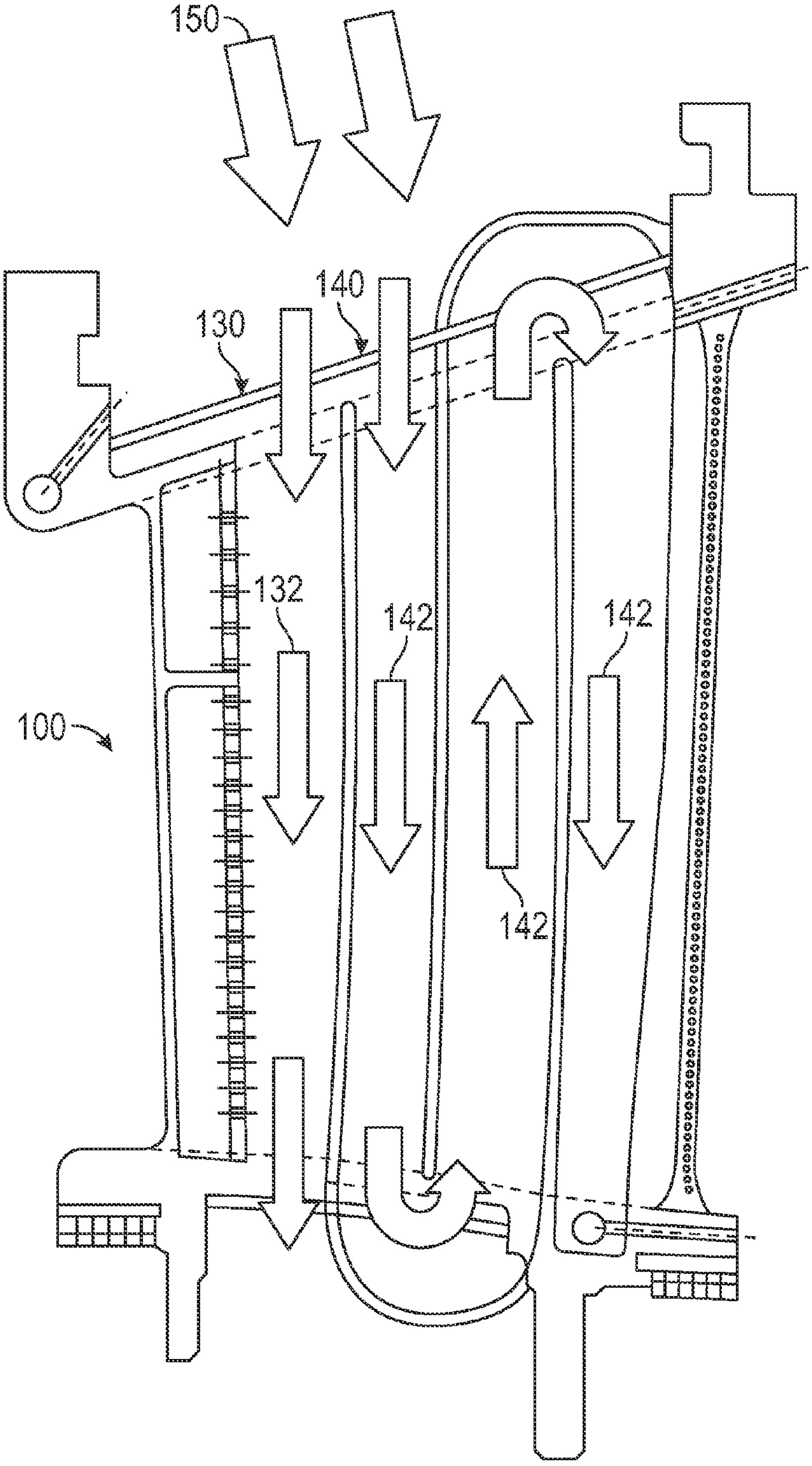
FIG. 4 is a cross-sectional view of the turbine vane showing how cooling air applied to the outer end of the vane flows through a leading edge cooling passage and a trailing edge cooling passage.

FIG. 4 is a cross-sectional view of the turbine vane 100 showing how cooling air is supplied from the outer casing and flows through the vane 100 to cool it. The leading edge cooling passage inlet 130 and the trailing edge cooling passage inlet 140, shown in FIG. 2, can be seen in FIG. 4. The leading edge cooling passage inlet 130 feeds cooling air to a leading edge cooling passage 132, which passes straight through from the outer end (the outer shroud 102) to the inner end (the inner shroud 104) of the vane 100. The trailing edge cooling passage inlet 140 feeds cooling air to a trailing edge cooling passage 142, which follows a three-pass serpentine route from the outer end to the inner end of the vane 100, as seen in FIG. 4. Cooling air supply 150 is also shown being directed down on the top or outer end of the vane 100, where some of the cooling air supply 150 passes through the impingement plate 118 onto the outer shroud 102, as discussed above, and some of the cooling air supply 150 passes through the leading edge cooling passage 132 and the trailing edge cooling passage 142.

As discussed previously, it is an objective of the inventions described herein to allow a reduction in the volume of the cooling air supply 150, in order to reduce the parasitic losses associated with blowing the air. Reducing cooling air volume—while maintaining the vane 100 within a specified temperature range—is possible if the convective heat transfer between the cooling air and the vane 100 is increased. Increased insulation on the outer surfaces of the vane 100 also enables reduced cooling air flow.

Figure 5:
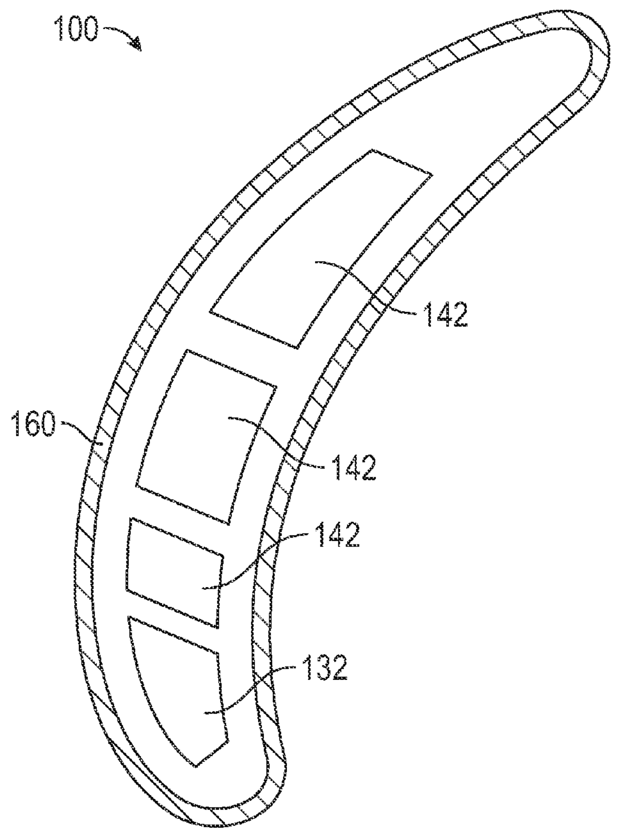
FIG. 5 is a cross-sectional view of the turbine vane showing a thermal barrier coating (TBC)

Referring again to FIG. 2, as described previously, the airfoil section of the vane 100 includes the leading edge 106, the trailing edge 108, the pressure side 110 and the suction side 112. In a typical design of the turbine 10, all of the surfaces (106, 108, 110, 112) of the vane 100 are covered with a thermal barrier coating (TBC) 160. FIG. 5 is a cross-sectional view of the vane 100 showing the TBC 160, along with the leading edge cooling passage 132 and the trailing edge cooling passage 142 discussed above. The TBC 160 is a comprised of a material which can withstand extremely high temperatures, such as ceramic. The TBC 160 also has a low thermal conductivity. The TBC 160 experiences the highest temperatures of any part of the vane 100, and thermally insulates the metal portion of the vane 100 (the casting) which operates at a somewhat lower temperature. In one existing design, the TBC 160 has a thickness of 0.360 mm, which maintains the maximum temperature in the metal body portion of the vane 100 within the specified range appropriate for the material.

By increasing the thickness of the TBC 160, it is possible to achieve lower steady state temperatures within the vane 100. Alternately, with the thicker TBC 160, it is possible to reduce the flow rate of cooling air and maintain essentially the same steady-state temperatures within the vane 100 as with the nominal TBC thickness and higher cooling flow rates. As discussed above, reducing the flow rate of cooling air through the turbine vanes results in a higher turbine efficiency due to the reduction in parasitic energy loss associated with the lower cooling air requirements.

Figure 6:
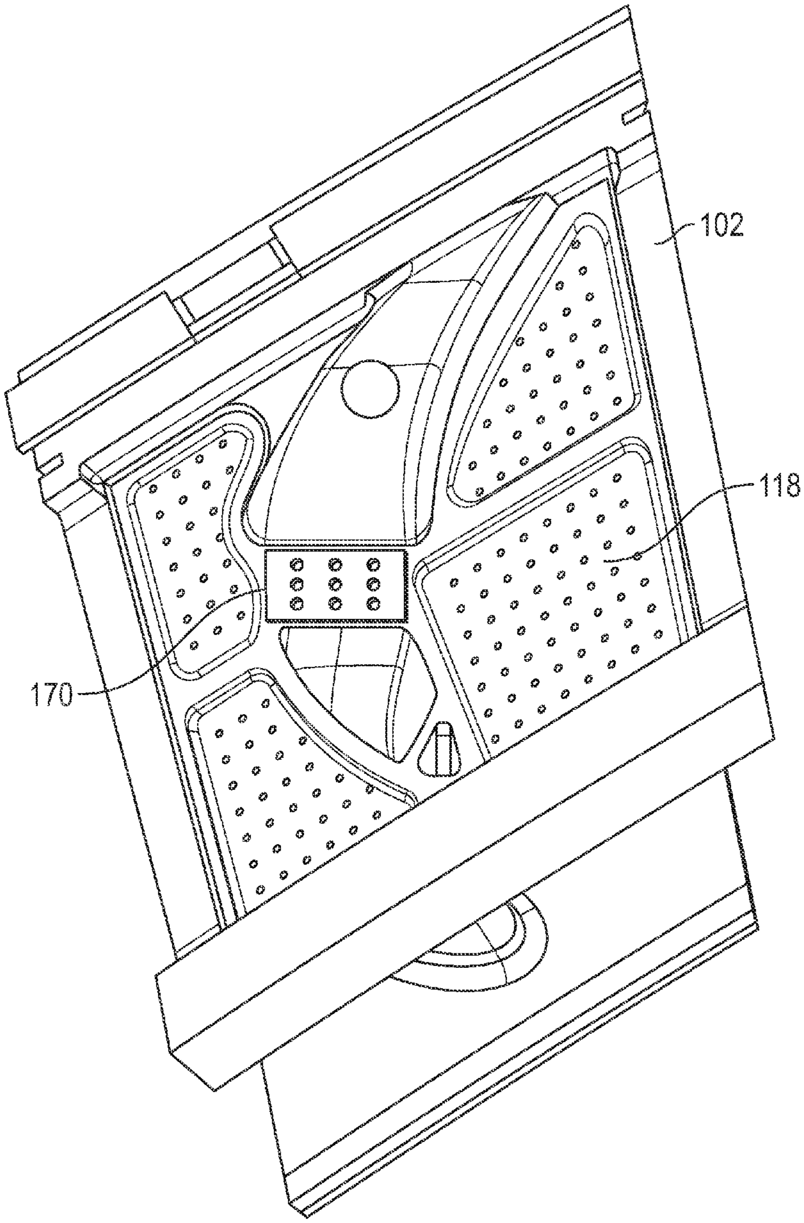
FIG. 6 is a perspective view illustration of the top or outer end of the turbine vane showing a flow metering plate positioned over the inlet of the trailing edge cooling passage.

FIG. 6 is a perspective view illustration of the top or outer end of the turbine vane 100 showing a flow metering plate 170 positioned over the trailing edge cooling passage inlet 140. The impingement plate 118 can be seen covering the outer shroud 102, as shown and discussed previously. The flow metering plate 170 is added, positioned over the trailing edge cooling passage inlet 140, to reduce the flow of cooling air through the trailing edge cooling passage 142.

In one embodiment, for a second-row vane in a Siemens SGT6-6000G turbine, the thickness of the TBC 160 is increased from 0.360 mm to 0.575 mm, and the flow metering plate 170 has nine circular holes of 4.70 mm diameter. This increase in TBC thickness allows the vane 100 to run cooler, while not adversely affecting the aerodynamic performance of the vane 100. This corresponding design of the flow metering plate 170 has been shown to reduce the trailing edge passage cooling air flow from 0.254 kg/s to 0.179 kg/s. Furthermore, this combination of TBC thickness and cooling air flow rate maintains the metal temperature in the vane 100 within limits, as the metering plate 170 has been designed using computational fluid dynamics (CFD) analysis to achieve the cooling air flow rate needed to maintain the vane temperature. Specifically, the portion of the vane 100 cooled by the leading edge cooling passage 132, which has unchanged air flow rate, runs cooler than in the nominal design, due to the effect of the increased TBC thickness. The portion of the vane 100 cooled by the trailing edge cooling passage 142 runs at very similar temperatures as the nominal design, due to the offsetting effects of the increased TBC thickness and the specifically targeted reduction of cooling air flow.

The flow metering plate 170 can be attached to the impingement plate 118 in any suitable manner, such as by welding or brazing. Alternately, the flow metering plate 170 could be placed underneath of, and held in place by, the impingement plate 118. By making the flow metering plate 170 a separate piece from the impingement plate 118, existing supplies of the impingement plate 118 can be used, and the flow metering plate 170 can be added to only those vanes with the increased thickness of the TBC 160.

Figure 7:
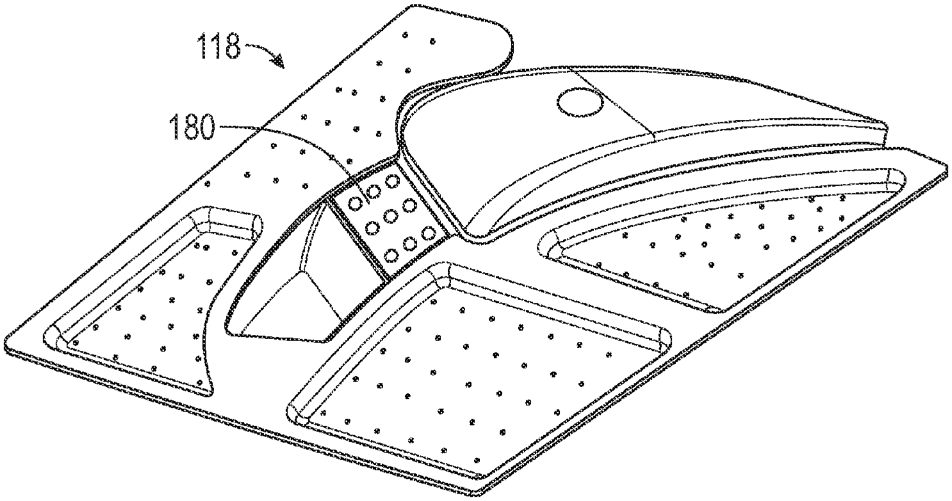
FIG. 7 is an illustration of a re-designed impingement plate with an integral multi-hole orifice plate for metering cooling air flow through the trailing edge cooling passage.

FIG. 7 is an illustration of a re-designed impingement plate 118 with an integral multi-hole orifice plate 180 for metering cooling air flow through the trailing edge cooling passage 142. By integrating the multi-hole orifice plate 180 into the impingement plate 118, cooling air flow through the trailing edge cooling passage 142 is reduced without requiring a separate piece to be handled in the assembly of the vane 100 into the turbine 10. The impingement plate 118 with integrated multi-hole orifice plate 180 would be the best solution for situations where the design of the vane 100 is fully changed over to include the increased thickness of the TBC 160, and using up remaining stock of the impingement plate 118 is not a consideration.

Figure 8A:
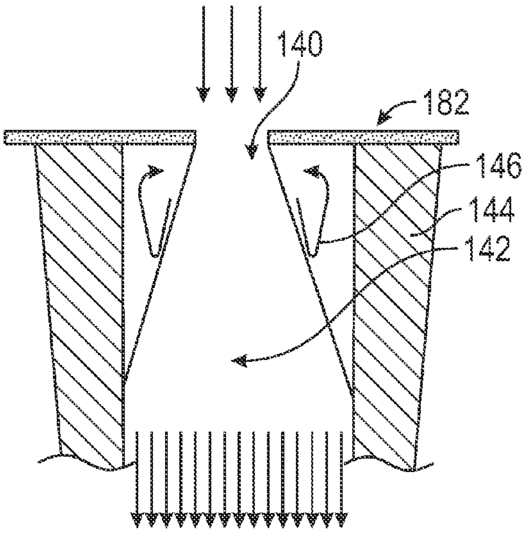
FIG. 8A is a cross-sectional illustration of the inlet of the trailing edge cooling passage with a single-orifice metering plate showing cooling air flow separation from the inlet walls.
Figure 8B:
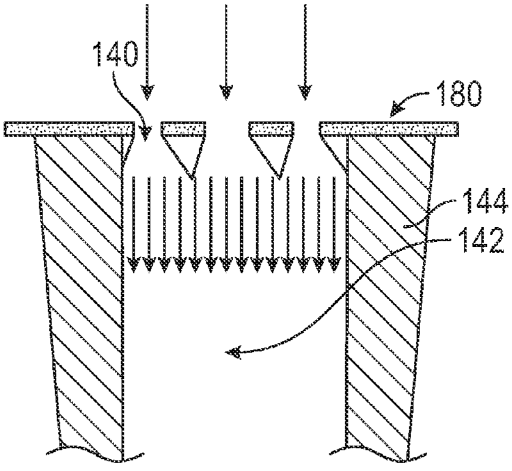
FIG. 8B is a cross-sectional illustration of the inlet of the trailing edge cooling passage with a multi-orifice metering plate showing cooling air flow attachment along the inlet walls.

FIGS. 8A and 8B are cross-sectional illustrations of the trailing edge cooling passage inlet 140 and the trailing edge cooling passage 142, with two different types of orifice plate restrictions. In FIG. 8A, a conventional single-orifice metering plate 182 is used over the trailing edge cooling passage inlet 140. With a large, single orifice, the cooling air flow separates from cooling passage walls 144, resulting in eddy currents 146. The eddy currents 146 cause stagnation in the cooling air flow, significantly reducing the convective heat transfer from the passage walls 144 to the cooling air. This poor air flow pattern results in hot spots in the passage walls 144 and uneven temperature distribution in the vane 100. Thus, while the overall average temperature of the vane 100 may be acceptable, there may be locations near the eddy currents 146 in the trailing edge cooling passage 142 where the temperature is too high.

In FIG. 8B, the trailing edge cooling passage inlet 140 is covered with the multi-hole orifice plate 180 of FIG. 7. By using many small orifices, the cooling air flow remains attached along the inlet walls 144, with no eddy currents or low heat transfer zones. Thus, the cooling air flow is effective throughout the length of the trailing edge cooling passage 142, and hot spots are avoided. As discussed above, an orifice plate design with nine round holes of 4.70 mm diameter results in a cooling air flow reduction from 0.254 kg/s to 0.179 kg/s. This 30% air flow reduction can be combined with an increase in thickness of the TBC 160, with resultant vane temperatures remaining within specification. In order to further improve the effectiveness of the cooling air, the holes in the orifice plate 180 could be arranged around the periphery of the plate 180, so that the cooling air flow is substantially directed along the walls 144 of the trailing edge cooling passage 142. That is, in FIG. 7, the center orifice hole in the orifice plate 180 could be omitted. The specific number, size and location of the orifice holes in the orifice plate 180 can be designed to meet the flow reduction and heat transfer requirements of a specific vane application.

There are other ways to reduce cooling air flow through the trailing edge cooling passage 142, besides placing an orifice plate over its inlet. In the following discussion, flow control insert devices are described. These devices are placed inside the trailing edge cooling passage 142, where they serve to both reduce the cooling air flow rate and increase the convective heat transfer coefficient between the cooling air and the inlet walls 144.

Figure 9:
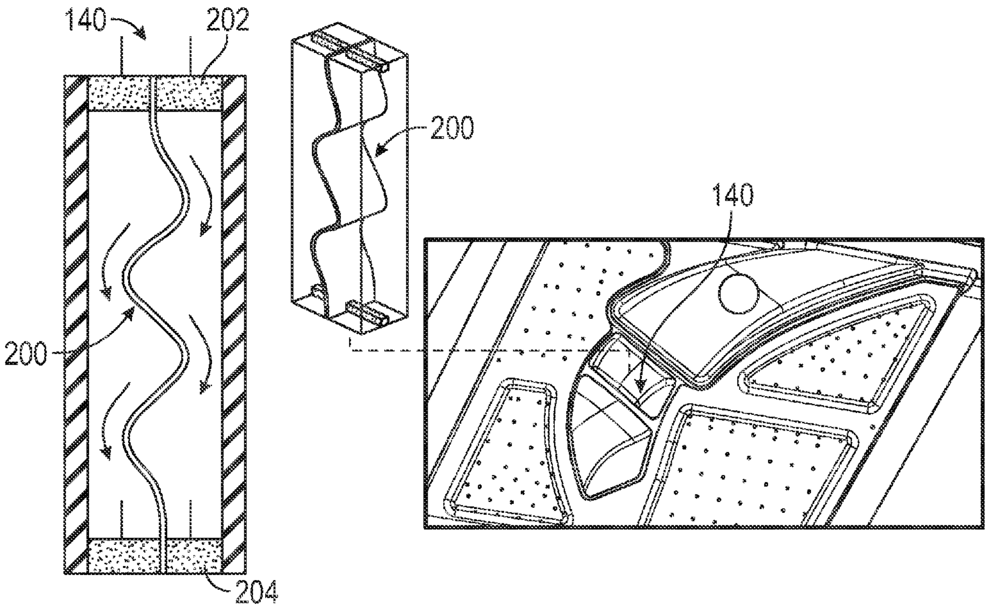
FIG. 9 is an illustration of a first embodiment of a flow control insert which can be placed into the inlet of the trailing edge cooling passage.

FIG. 9 is an illustration of a first embodiment of a flow control insert device which can be placed into the trailing edge cooling passage inlet 140. Flow control insert 200 is, in one preferred embodiment, a thin strip of metal formed with a wavy shape. As shown in FIG. 9, the flow control insert 200 is shaped to fit down into the trailing edge cooling passage inlet 140, inside the trailing edge cooling passage 142, where it causes the cooling air flow to be directed against the walls 144 of the vane 100. Specifically, the insert 200 causes the cooling air flow to be directed against the walls on the pressure side 110 and the suction side 112 of the vane 100—not the interior-facing walls which separate the leading edge cooling passage 132 and the trailing edge cooling passage 142. The air flow acceleration and lateral velocity caused by the flow control insert 200 increases the convective heat transfer between the walls 144 and the cooling air, thus allowing a cooling air flow rate reduction while maintaining vane temperature within specification. The insert 200 also serves as an obstruction which creates a pressure drop and therefore causes the desired cooling air flow rate reduction.

The flow control insert 200 includes a top support tab 202 and a bottom support tab 204, perpendicular to the plane of the metal strip, which keep the top and bottom of the insert 200 in the center of the trailing edge cooling passage 142. The support tabs 202 and 204 could be fabricated from the same single piece of metal as the body of the insert 200, and partially sheared and folded into shape. Alternately, the support tabs 202 and 204 could be fabricated from separate pieces of metal and mechanically attached to the body of the insert 200. Regardless of how it is fabricated, the flow control insert 200 is to be inserted down into the top of the trailing edge cooling passage inlet 140 during assembly of the vane 100, before the vane 100 is assembled into the turbine 10. The amount of pressure drop and the increase in convective heat transfer can be tailored to a specific vane application by changing the pitch and/or amplitude of the waves in the insert 200 along its length.

Figure 10:
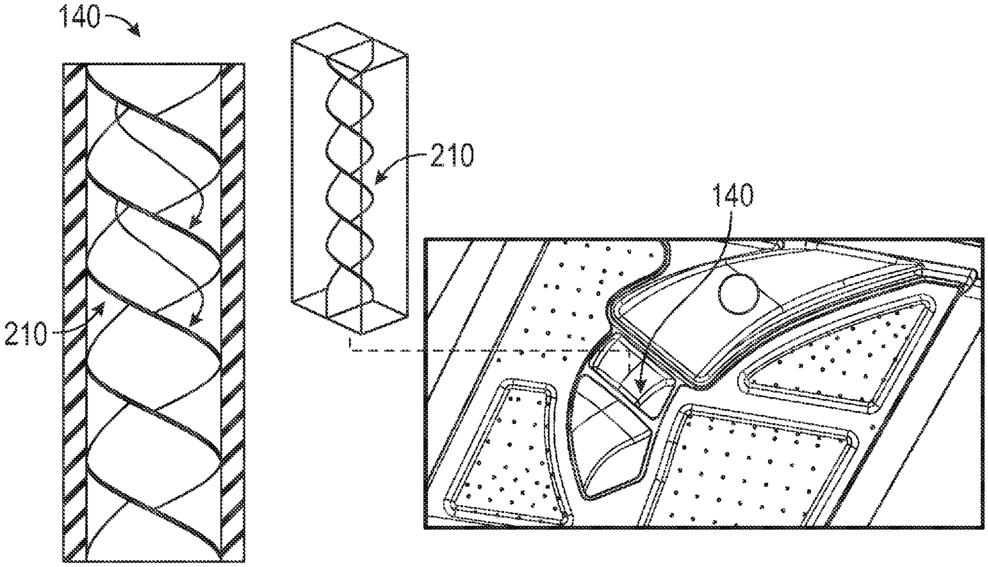
FIG. 10 is an illustration of a second embodiment of a flow control insert which can be placed into the inlet of the trailing edge cooling passage.

FIG. 10 is an illustration of a second embodiment of a flow control insert device which can be placed into the trailing edge cooling passage inlet 140. Flow control insert 210 is, in one preferred embodiment, a thin strip of metal formed into a twisted shape. As shown in FIG. 10, the flow control insert 210 is shaped to fit down into the trailing edge cooling passage inlet 140, inside the trailing edge cooling passage 142, where it causes the cooling air flow to swirl against the walls 144 of the vane 100. The flow control insert 210 offers the advantage of creating a swirling or twisting flow pattern in the cooling air which continues throughout the serpentine length of the trailing edge cooling passage 142. The swirling air flow motion caused by the flow control insert 210 increases the convective heat transfer between the walls 144 and the cooling air, thus allowing a cooling air flow rate reduction while maintaining vane temperature within specification. The insert 210 also serves as an obstruction which creates a pressure drop and therefore causes the desired cooling air flow rate reduction.

Figure 11:
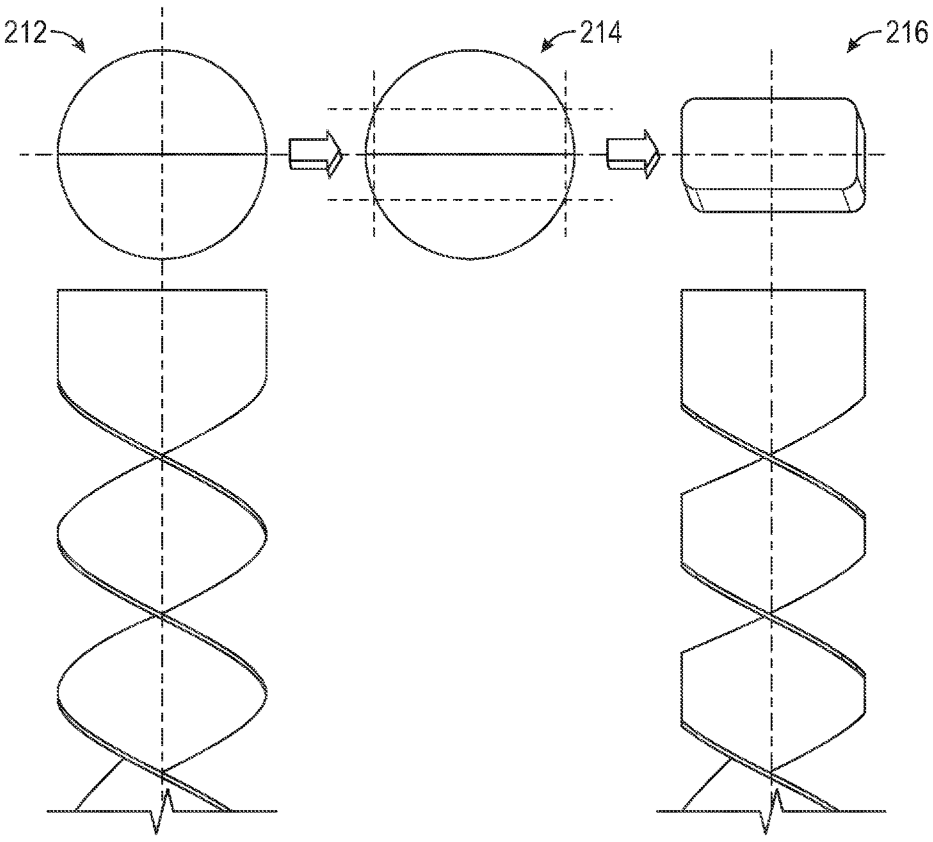
FIG. 11 is a diagram showing how the second embodiment of the flow control insert—the twisted strip—could be manufactured.

FIG. 11 is a diagram showing how the flow control insert 210—the twisted strip design—could be manufactured. At step 212, a flat metal strip is held fixed at one end while the other end is twisted. The number of twists depends on factors such as the length and width of the metal strip, but it is envisioned that at least one full twist would be applied. The pitch of the twist could also vary along the length of the insert 210. As a result of the twisting at the step 212, the insert 210 would have a round shape as viewed from either end (step 212, upper), and thus would not fit inside the trailing edge cooling passage 142 unless it was smaller in diameter than the narrow dimension of the trailing edge cooling passage 142. Rather than make the insert 210 this small, it is envisioned to make it large enough to fill the volume of the trailing edge cooling passage 142 when trimmed.

At step 214, the insert 210 is trimmed to a generally rectangular shape as viewed from either end, to match the shape of the trailing edge cooling passage 142. The trimming operation at the step 214 could be accomplished in the most economical fashion. For example, the twisted strip from the step 212 could be encased in a wax or plastic to form a circular cylinder, and this cylinder could be machined into a rectangular prismatic shape. The wax or plastic could then be melted away, resulting in the final shape as shown at step 216. Alternately, a metal-cutting laser could be used to slice away the excess material at the step 214, without requiring the encasement in wax or plastic. Regardless of how it is fabricated, the flow control insert 210 is to be inserted down into the top of the trailing edge cooling passage inlet 140 during assembly of the vane 100, before the vane 100 is assembled into the turbine 10. The amount of pressure drop and the increase in convective heat transfer can be tailored to a specific vane application by changing the pitch of the twists along its length.

The flow control inserts 200 and 210 are described above as being fabricated of thin metal strips. However, other materials could also be used. The inserts 200 and 210 could also be metal castings. The material used for the flow control inserts 200 and 210 is of less importance than their shape, which is designed to simultaneously reduce cooling air flow rate and increase cooling air flow heat transfer. Furthermore, using one of the flow control inserts 200 or 210, the simultaneous reduction of cooling air flow and increase of heat transfer is accomplished without changing the design of the vane 100 itself. The flow control inserts 200 or 210 can have a length up to just slightly less than the height of the vane 100, such that they occupy most of the first downward pass of the trailing edge cooling passage 142. Shorter insert designs may also be desirable in some cases.

Figure 12:
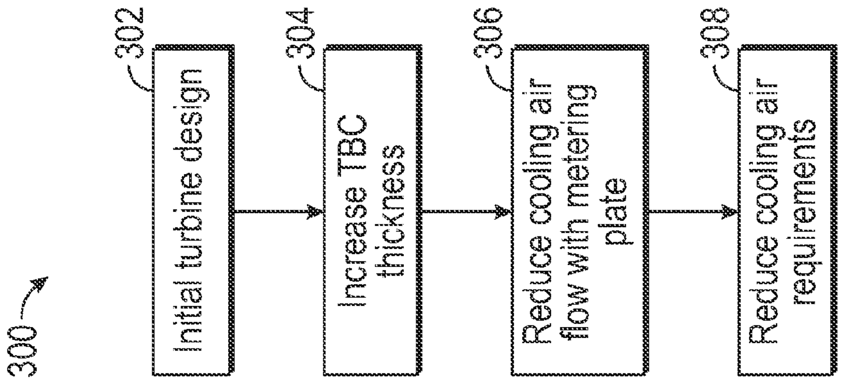
FIG. 12 is a flowchart diagram of a method for improving gas turbine efficiency using an increased thermal barrier coating thickness with a cooling flow metering plate.

FIG. 12 is a flowchart diagram 300 of a method for improving gas turbine efficiency using an increased thermal barrier coating thickness with a cooling flow metering plate. At box 302, an initial turbine design is provided. As discussed above, the initial turbine design includes a design of the vane 100 where the machined casting comprising the body of the vane 100 is not to be changed for cost reasons. At box 304, the thickness of the TBC is increased to allow the vane 100 to run at a cooler operating temperature. At box 306, the flow of cooling air is reduced by placing a restriction over the trailing edge cooling passage 142, where the restriction is the flow metering plate 170. At box 308, the volume of cooling air provided is reduced because of the reduced cooling air flow through the vane's trailing edge cooling passage 142. This results in a reduction of cooling air requirements and, in turn, an increase in the overall efficiency of the combustion gas turbine engine.

Figure 13:
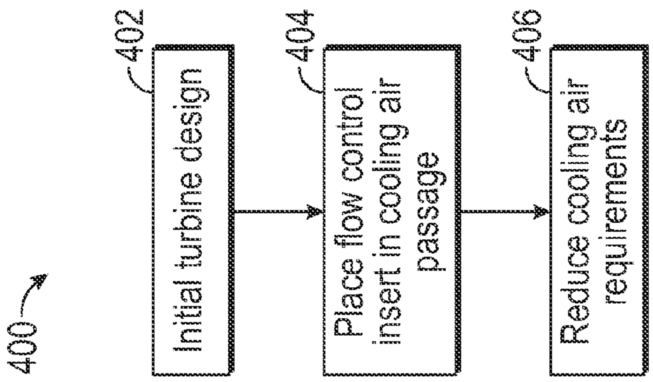
FIG. 13 is a flowchart diagram of a method for improving gas turbine efficiency using a flow control insert in a vane cooling passage.

FIG. 13 is a flowchart diagram 400 of a method for improving combustion gas turbine efficiency using a flow control insert in a vane cooling passage. At box 402, an initial turbine design is provided. As discussed above, the initial turbine design includes a design of the vane 100 where the machined casting comprising the body of the vane 100 is not to be changed for cost reasons. At box 404, a flow control insert is placed in the trailing edge cooling passage 142. The flow control insert—which could be the wavy insert 200 or the twisted insert 210—both restricts cooling air flow and increases convective heat transfer between the passage walls 144 and the cooling air. At box 406, the volume of cooling air provided is reduced because of the reduced cooling air flow through the vane's trailing edge cooling passage 142. This results in a reduction of cooling air requirements and, in turn, an increase in the efficiency of the combustion gas turbine engine.

Figure 14:
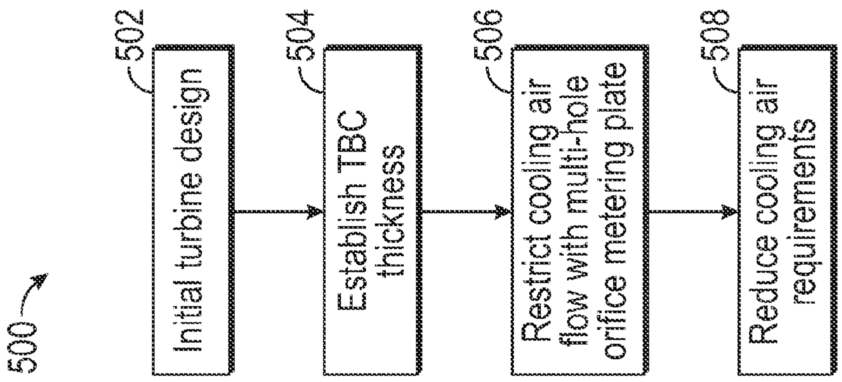
FIG. 14 is a flowchart diagram of a method for improving gas turbine efficiency using a multi-orifice cooling flow metering plate with optimized orifice hole pattern.

FIG. 14 is a flowchart diagram 500 of a method for improving gas turbine efficiency using a multi-orifice cooling flow metering plate with optimized orifice hole pattern. At box 502, an initial turbine design is provided. As discussed above, the initial turbine design includes a design of the vane 100 where the machined casting comprising the body of the vane 100 is not to be changed for cost reasons. At box 504, the thickness of the TBC is established to allow the vane 100 to run at a certain operating temperature. At box 506, the flow of cooling air is reduced by placing a restriction over the trailing edge cooling passage 142, where the restriction is the multi-hole orifice plate 180 with hole locations designed to optimize convective heat transfer between the passage walls 144 and the cooling air. At box 508, the volume of cooling air provided is reduced because of the reduced cooling air flow through the vane's trailing edge cooling passage 142. This results in a reduction of cooling air requirements and, in turn, an increase in the efficiency of the combustion gas turbine engine.

Using the techniques described above, the efficiency of a gas turbine engine can be improved by reducing the volume of cooling air required by vanes in the turbine. Achieving cooling air flow reduction and other thermal management improvements without changing the vane's casting allows efficiency gains to be realized without undertaking the expense of a lengthy re-design and re-validation of the vane casting part and tools.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for improving efficiency of a gas turbine engine, said method comprising:

providing an initial turbine design including a turbine vane comprising a machined casting;

placing a flow control insert in a cooling air passage in the turbine vane, where the flow control insert creates a pressure drop which reduces a cooling air flow rate and also creates disturbances in a flow of cooling air which increase heat transfer between walls of the cooling air passage and the cooling air, and where the flow control insert is a metal strip formed into a wave pattern with support tabs at both ends, where the support tabs hold the flow control insert in a centered position in the cooling air passage; and increasing turbine efficiency due to the reduction in cooling air flow rate.

2. The method of claim 1 wherein the cooling air passage is a trailing edge cooling air passage which takes a three-pass serpentine route through the turbine vane, and the flow control insert has a length which causes the insert to occupy most of a first downward pass of the trailing edge cooling air passage.

3. The method of claim 1 wherein the flow control insert is oriented in the cooling air passage such that the wave pattern causes increased heat transfer along pressure side and suction side walls of the cooling air passage.

4. The method of claim 1 wherein the turbine vane is a second-row vane in a Siemens SGT6-6000G turbine.

5. A turbine vane with cooling air flow control for improving efficiency of a gas turbine engine, said turbine vane comprising:

a vane body, said body comprising a machined casting including an airfoil section with one or more internal cooling air passages; and a flow control insert placed in one of the cooling air passages in the vane body, where the flow control insert creates a pressure drop which reduces a cooling air flow rate and also creates disturbances in a flow of cooling air which increase heat transfer between walls of the cooling air passage and the cooling air, and where the flow control insert is a metal strip formed into a wave pattern with support tabs at both ends, where the support tabs hold the flow control insert in a centered position in the cooling air passage.

6. The turbine vane of claim 5 wherein one of the cooling air passages is a trailing edge cooling air passage which takes a three-pass serpentine route through the turbine vane.

7. The turbine vane of claim 6 wherein the flow control insert has a length which causes the insert to occupy most of a first downward pass of the trailing edge cooling air passage.

8. The turbine vane of claim 5 wherein the flow control insert is oriented in the cooling air passage such that the wave pattern causes increased heat transfer along pressure side and suction side walls of the cooling air passage.

9. The turbine vane of claim 5 wherein the wave pattern in the metal strip changes in pitch or amplitude along a length of the metal strip.

10. The turbine vane of claim 5 wherein the turbine vane is a second-row vane in a Siemens SGT6-6000G turbine.

11. A second-row turbine vane for improving efficiency of a Siemens SGT6-6000G gas turbine engine, said turbine vane comprising:

a vane body, said body comprising a machined casting including an airfoil section with an internal leading edge cooling air passage and an internal trailing edge cooling air passage; and a flow control insert placed in the trailing edge cooling air passage in the vane body, where the flow control insert creates a pressure drop which reduces a cooling air flow rate and also creates disturbances in a flow of cooling air which increase heat transfer between walls of the trailing edge cooling air passage and the cooling air, and where the flow control insert is a metal strip formed into a wave pattern with support tabs at both ends, where the support tabs hold the flow control insert in a centered position in the trailing edge cooling air passage, and where the flow control insert is oriented in the trailing edge cooling air passage such that the wave pattern causes increased heat transfer along pressure side and suction side walls of the trailing edge cooling air passage.

* * * * *